US006404121B1

(12) United States Patent
Goto et al.

(10) Patent No.: US 6,404,121 B1
(45) Date of Patent: Jun. 11, 2002

(54) EXPLOSION-PROOF TAPE FOR CATHODE-RAY TUBE AND EXPLOSION-PROOF STRUCTURE THEREOF

(75) Inventors: Yoichiro Goto; Koichi Nakamura; Hiroshi Yamamoto, all of Osaka; Kazukuni Tamaki; Toshio Nagata, both of Kanagawa, all of (JP)

(73) Assignees: Nitto Denko Corporation, Osaka; Sony Corporation, Tokyo, both of (JP)

( * ) Notice: Subject to any disclaimer, the term of this patent is extended or adjusted under 35 U.S.C. 154(b) by 91 days.

(21) Appl. No.: 09/671,265

(22) Filed: Sep. 28, 2000

(30) Foreign Application Priority Data

Sep. 29, 1999 (JP) .......................................... 11-275687

(51) Int. Cl.[7] .............................. H01J 29/87; C09J 7/02

(52) U.S. Cl. .................... 313/479; 313/482; 220/2.1 A; 348/822; 428/343

(58) Field of Search ................................. 313/482, 479; 220/2.1 A, 2.3 A; 348/822, 821; 428/911, 343

(56) References Cited

U.S. PATENT DOCUMENTS 3,873,638 A * 3/1975 Olson ..................... 260/837 R
3,912,105 A 10/1975 Eisses et al.

FOREIGN PATENT DOCUMENTS

GB 1 426 767 3/1976
JP 411297237 * 10/1999 ............ H01J/29/87

OTHER PUBLICATIONS

Patent Abstracts of Japan, vol. 018, No. 434, Japanese Publication 06–139962, May 20, 1994.
Patent Abstracts of Japan, vol. 014, No. 028, Japanese Publication 01–265432, Oct. 23, 1989.

* cited by examiner

*Primary Examiner*—Vip Patel
*Assistant Examiner*—Thelma Sheree Clove
(74) *Attorney, Agent, or Firm*—Whitham, Curtis & Christofferson, P.C.

(57) ABSTRACT

An explosion-proof tape is wound on an outer circumference of a panel portion of a cathode-ray tube and a metal band is shrink-fitted on the tape. The tape is composed of a support having at least a layer composed of propylene polymer with a propylene content of not less than 40 weight % or styrene polymer with a styrene content of not less than 50 weight % and an adhesive layer formed on one surface of the support in a manner so that a plurality of fibers with a softening point of not lower than 200° C. are buried in the adhesive layer in a lengthwise direction of the tape. An explosion-proof structure of a cathode-ray tube, wherein a metal band is shrink-fitted on an outer circumference of a panel portion of a cathode-ray tube, through a layer which is formed by winding such an explosion-proof tape as mentioned above, through its adhesive layer.

4 Claims, 2 Drawing Sheets

EXPLOSION-PROOF TAPE FOR CATHODE-RAY TUBE AND EXPLOSION-PROOF STRUCTURE THEREOF

BACKGROUND OF THE INVENTION

1. Field of the Invention

The present invention relates to an explosion-proof tape of a cathode-ray tube and an explosion-proof structure of the cathode-ray tube, in which a metal band shrink-fitted to the outer circumference of the cathode-ray tube through the tape can be removed easily so that the cathode-ray tube can be recycled efficiently. The present application is based on Japanese Patent Application No. Hei. 11-275687, which is incorporated herein by reference.

2. Description of the Related Art

A cathode-ray tube often used as a television picture tube, a monitor for a personal computer, a word processor, etc., or the like, is subjected to explosion-proof treatment so as to be prevented from implosion because the cathode-ray tube is formed as a glass tube the inside of which is at a vacuum. A structure where an explosion-proof tape is wound on the outer circumference of a panel portion of the cathode-ray tube and a metal band is shrink-fitted on the tape is a typical one of the explosion treatment. According to such an explosion-proof structure, a bending moment generated by the atmosphere against the front surface of the cathode-ray tube due to the vacuum inside the cathode-ray tube is relieved and reduced by an opposite bending moment acting on the basis of the clamping pressure of the metal band so that the implosion is prevented.

In the background art, as such an explosion-proof tape, there has been known a tape in which a rubber or acrylic adhesive layer or the like to adhere to a cathode-ray tube in high strength is provided on a support formed by laminating a polyester or polyethylene layer on a glass or cotton cloth. According to this explosion-proof tape, when the explosion-proof tape is bonded with a cathode-ray tube through the adhesive layer and a metal band is shrink-fitted thereon, the support of the explosion-proof tape is fused to adhere to the metal band firmly.

However, when it is attempted to salvage an abandoned cathode-ray tube and reclaim glass material therefrom in view of the preservation of global environment, the effective use of resources, and so on, it is difficult to break up the cathode-ray tube because the metal band firmly adheres to the cathode-ray tube through the fused solid layer of the explosion-proof tape. In addition, there is a problem that the fused solid support of the explosion-proof tape projecting from the metal band adhere to the cathode-ray tube firmly so that it takes much time and much labor for the work of erasing the fused solid substances, the processing of grinding them, or the like. Thus, such problems have been obstacles to recycling cathode-ray tubes.

In the above-mentioned case, if it is insufficient to erase the fused solid layer of the explosion-proof tape from the cathode-ray tube, the components of the explosion-proof tape are carbonized to lower the quality of glass material obtained by the operation of reduction thereof when the cathode-ray tube is broken up into a panel portion and a funnel portion in the form of cutlet and the cullet is fused to obtain reclaimed glass. Particularly high-purity is required of lead glass which forms the panel portion of the cathode-ray tube. Therefore, such inclusion of impurities makes it difficult to reclaim lead glass for forming the panel portion.

In addition, in the background-art explosion-proof structure, in the case where there arises an error in bonding such as a displacement of the metal band, the fused solid substances of the explosion-proof tape remain on the cathode-ray tube even if the metal band is cut and removed. As a result, not only is it difficult to remove the fused solid substances, but also it is apt to damage the cathode-ray tube. If the cathode-ray tube is damaged when the remainders of the explosion-proof tape are removed, there arises a fear that the cathode-ray tube implodes due to stress concentration. Thus, the cathode-ray tube should not be put into practical use.

SUMMARY OF THE INVENTION

It is an object of the present invention to develop an explosion-proof tape and an explosion-proof structure for a cathode-ray tube, in which the explosion-proof tape applied onto the outer circumference of a panel portion of the cathode-ray tube as explosion-proof treatment, and a metal band shrink-fitted on the explosion-proof tape can be removed easily and safely so that the breaking-up and recycling of the cathode-ray tube or the reclamation of the cathode-ray tube unsuccessful in the explosion-proof treatment can be performed efficiently.

According to the present invention, there is provided an explosion-proof tape wound on an outer circumference of a panel portion of a cathode-ray tube so that a metal band is shrink-fitted on the tape, the tape comprising: a support having at least a layer composed of propylene polymer with a propylene content of not less than 40 weight % or styrene polymer with a styrene content of not less than 50 weight %; and an adhesive layer formed on one surface of the support in a manner so that a plurality of fibers with a softening point of not lower than 200° C. are buried in the adhesive layer in a lengthwise direction of the tape. There is further provided an explosion-proof structure of a cathode-ray tube, wherein a metal band is shrink-fitted on an outer circumference of a panel portion of a cathode-ray tube, through a layer which is formed by winding such an explosion-proof tape as mentioned above, through its adhesive layer.

According to the present invention, the shrink-fitted metal band is heated and expanded in the same manner as when the metal band was shrink-fitted, so that the metal band can be removed easily and efficiently even by hand, and the explosion-proof tape remaining on the cathode-ray tube can be also peeled off and removed together with the adhesive layer through the support thereof easily and efficiently even by hand. As a result, the metal band and the explosion-proof tape applied onto the cathode-ray tube as explosion-proof treatment are removed easily by hand or the like so that the cathode-ray tube can be broken up into a panel portion and a funnel portion. The broken-up portions are subjected to fusing treatment so that glass material kept as high in purity as that before the treatment can be reclaimed. The reclaimed glass material can be served for recycling efficiently as glass material with quality equal to that before the reclamation.

In addition, even if there arises an error in manufacture such as an error in bonding, for example, a divergence of the metal band at the time of the explosion-proof treatment, the metal band and the explosion-proof tape can be removed from the cathode-ray tube more easily and without damaging the cathode-ray tube. Thus, the cathode-ray tube can be salvaged and reused efficiently without being broken up.

Features and advantages of the invention will be evident from the following detailed description of the preferred embodiments described in conjunction with the attached drawings.

DETAILED DESCRIPTION OF THE PREFERRED EMBODIMENTS

An explosion-proof tape according to the present invention has a support having at least a layer composed of propylene polymer with a propylene content of not less than 40 weight % or styrene polymer with a styrene content of not less than 50 weight % and an adhesive layer formed on one surface of the support in a manner so that a plurality of fibers with a softening point of not lower than 200° C. are buried in the adhesive layer in a lengthwise direction of the tape. The explosion-proof tape is wound on the outer circumference of a panel portion of a cathode-ray tube through the adhesive layer, and a metal band is shrink-fitted thereon. Thus, an explosion-proof structure is formed.

Figure 1:
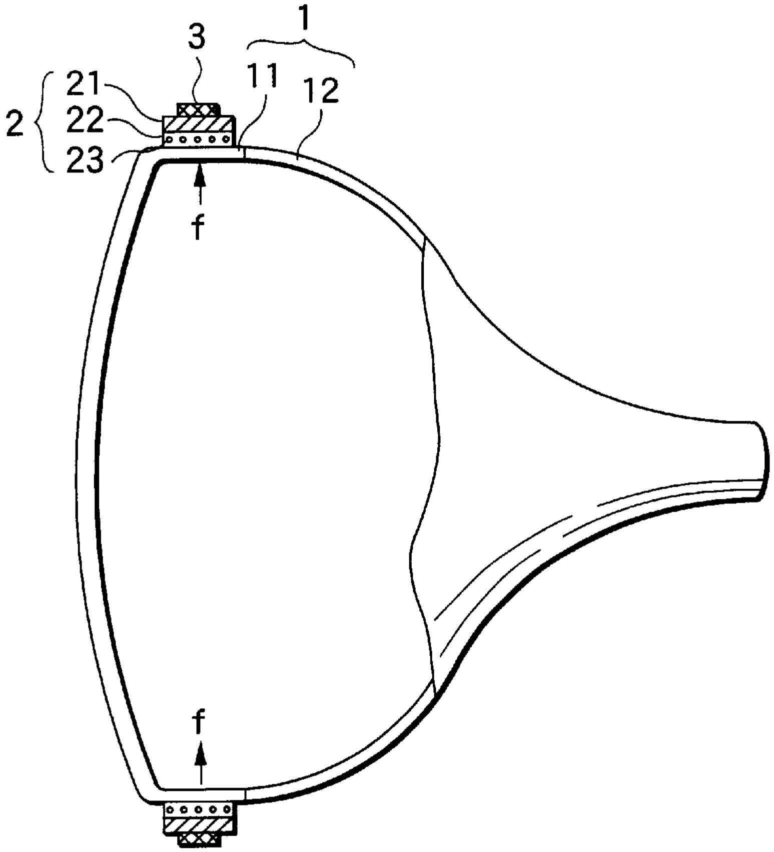
FIG. 1 shows a sectional view of an embodiment of an explosion-proof structure.
Figure 2:
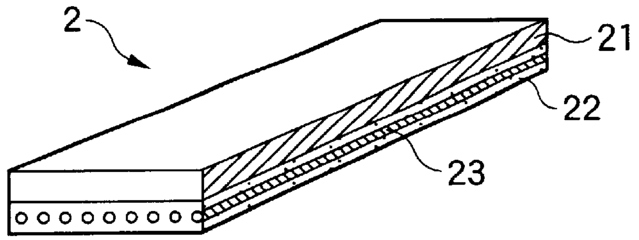
FIG. 2 shows a partially sectional perspective view of an embodiment of an explosion-proof tape.

FIG. 1 shows an embodiment of the foregoing explosion-proof structure, and FIG. 2 shows an embodiment of the foregoing explosion-proof tape. The reference numeral 1 represents a cathode-ray tube constituted by a panel portion 11 and a funnel portion 12; 2, an explosion-proof tape constituted by a support 21 and an adhesive layer 22; and 3, a metal band. The reference numeral 23 represents fibers buried in the adhesive layer 22.

According to the present invention, there is used an explosion-proof tape in which the adhesive layer 22 is provided on one surface of the support 21 which has at least a layer composed of propylene polymer with a propylene content of not less than 40 weight % or styrene polymer with a styrene content of not less than 50 weight %, as shown in FIG. 2.

Examples of such propylene polymers for forming the support include propylene homopolymer; random or block copolymer of propylene and ethylene, ethylene-propylene rubber, or a mixture of polypropylene and polyethylene, which are prepared so that the propylene content is not less than 40 weight %; a mixture using two or more kinds of such polymers; and so on.

Examples of such styrene polymers include styrene homopolymer; styrene-isoprene copolymer, styrene-butadiene copolymer, styrene-isoprene-styrene copolymer, styrene-butadiene-styrene copolymer, or a mixture of one or more kinds of such copolymers and styrene homopolymer, which are prepared so that the styrene content is not less than 50 weight %; and so on.

From the point of the easiness in release from a shrink-fitted metal band, it is preferable that the support has a layer composed of propylene or styrene homopolymer at least on the surface. On the other hand, the position where the metal band is shrink-fitted in the cathode-ray tube is tapered so that the band is apt to slip to produce a displacement. In the case where measures to fix the position of the band, or measures to prevent the displacement is desired, it is possible to use a support which is made to contain the above-mentioned components such as ethylene, isoprene, butadiene, etc., so that slight adhesive force is generated between the support and the metal band when the metal band is shrink-fitted.

From the point of the compatibility between the easiness in release and the anti-slip adhesive force in the metal band, in the case of propylene polymer, it is preferable that the propylene content is in a range of not less than 50 weight %, especially in a range of from 55 weight % to 95 weight %, more especially in a range of from 65 weight % to 85 weight %. On the other hand, in the case of styrene polymer, it is preferable that the styrene content is in a range of not less than 60 weight %, especially in a range of from 65 weight % to 95 weight %, more especially in a range of from 70 weight % to 85 weight %.

If the propylene polymer contains the propylene content of less than 40 weight % or the styrene polymer contains the styrene content of less than 50 weight % in the above-mentioned support, the adhesive force between the support and the shrink-fitted metal band becomes so excessive that it becomes difficult to release the metal band easily by hand or the like.

The support can be obtained as a film or a sheet composed of propylene or styrene polymer, or a laminated body of such films, or a laminated body of such a film and optionally other bases composed of glass, cotton, or the like. From the point of workability in release, or the like, at the time of recycling, it is preferable that a film, a sheet, or the like, composed of propylene or styrene polymer is used as the support.

The thickness of the support may be decided appropriately in accordance with the size of the cathode-ray tube or the like. Although the thickness can be made to be above 1 mm, it is generally set in a range of from 5 $\mu$m to 500 $\mu$m, especially in a range of from 10 $\mu$m to 300 $\mu$m, more especially in a range of 20 $\mu$m to 200 $\mu$m. Suitable surface treatment such as corona treatment, primer treatment, or the like, for enhancing the close contact force with the adhesive layer, may be applied to the surface of the support to which the adhesive layer is applied.

As illustrated, the adhesive layer 22 provided on one surface of the support 21 may be formed of a suitable rubber or acrylic adhesive agent or the like. A preferable adhesive layer can be peeled off integrally with the support without any adhesive transfer onto the cathode-ray tube. Such an adhesive layer may be formed of a suitable known adhesive agent which is difficult to give rise to adhesive transfer, for example, a polyisobutylene adhesive agent, an acrylic adhesive agent containing (meth)acrylic alkyl ester-acrylic acid copolymer as base polymer, or the like.

An adhesive agent in which the residue becomes not more than 5 weight % by heat treatment at 700° C. or lower and for 30 minutes or shorter can be also used preferably. Such an adhesive agent is decomposed or gasified by low-temperature short-time heat treatment so as to show a good vanishing property. Thus, the adhesive agent hardly produces a residue of tar, carbon, or the like, causing the deterioration of the quality. Even if the scrapped panel portion or the like is subjected to fusing treatment while an adhesive of the adhesive layer transferred thereto is left as it is, the adhesive of the adhesive layer vanishes at that treatment so that high-purity glass material can be reclaimed. In addition, when there is an error in bonding the metal band, the adhesive layer is made to vanish by heat treatment or the like so that the cathode-ray tube can be served for salvage.

An adhesive agent showing a vanishing property in which the residue is reduced to 5 weight % or less by heat treatment at 700° C. or lower and for 30 minutes or shorter can be formed by use of polymer having a —O—O— group in base polymer in the molecular chain thereof, for example, polymethylene malonic diester such as polymethylene dimethyl malonate, polymethylene diethyl malonate, or polymethylene dipropyl malonate; butylene polymer; nitrocellulose polymer; $\alpha$-methyl-styrene polymer; propylene carbonate polymer; (meth)acrylic alkyl ester polymer; copolymer of hydrazide-group containing monomer and isocyanate-group containing monomer; etc.

The polymer having a —O—O— group in the molecular chain can be prepared, for example, by such a method that monomers such as (meth)acrylic alkyl ester, (meth)acrylic acid derivative having a carboxylic-acid derived group in a side chain, styrene, or styrene derivative, are radically polymerized while oxygen gas is supplied to a reaction system, so that one or more —O—O— groups are introduced into the molecular chain at random.

On the other hand, the polymethylene malonic diester can be prepared, for example, by such a method that ethoxymethylene malonic diester is hydrogenated under the existence of a catalyst such as platinum dioxide or the like in a solvent such as methanol, the solvent is removed, ethoxy groups are eliminated under heating, and methylene malonic diesters obtained thus are refined and polymerized through moisture in the atmosphere or the like.

On the other hand, the copolymer of hydrazide-group containing monomer and isocyanate-group containing monomer can be prepared, for example, by such a method that dihydrazides such as adipic dihydrazide, isophthalic dihydrazide, sebacic dihydrazide, dodecanedioic dihydrazide, 1,3-bis(hydrazinocarboethyl)-5-isopropyl hydantoin, eicosanedoic dihydrazide, or 7,11-octadecadiene-1,18-dicarbohydrazide, and diisocyanates such as hexamethylene diisocyanate, tolylene diisocyanate, methylene-bis(4-phenyl isocyanate), xylylene diisocyanate, or 3-isocyanatemethyl-3,5,5-trimethylcyclohexyl isocyanate, are subjected to polyaddition-polymerization.

In the above-mentioned adhesive agent, from the point of a low-temperature short-time vanishing property, it is preferable that the heat decomposition temperature of the base polymer is in a range of from 150° C. to 600° C., especially in a range of from 200° C. to 500° C., more especially in a range of from 250° C. to 400° C., and the base polymer shows a vanishing property in which the residue-is not more than 5 weight %, especially not more than 3 weight %, more especially not more than 2 weight %, by heat treatment at such a heating temperature for a heating time of not longer than 30 minutes, especially in a range of from 3 minutes to 20 minutes, more especially in a range of from 5 minutes to 15 minutes.

One or more kinds of polymers may be used as the base polymer of the adhesive layer. Examples of base polymers which can be used preferably from the point of a heat vanishing property or the like, include butene polymers such as polyisobutylene, and methacrylic polymers which have for its principal ingredient, methacrylic ester having a glass transition point at not higher than 30° C., especially at −20° C., such as butylmethacrylate, octyl methacrylate, lauryl methacrylate, etc. In addition, it is preferable that the weight average molecular weight of the base polymer is not more than 5 million, especially in a range of from a hundred thousand to 4 million, more especially in a range of from 2 hundred thousand to 3 million.

When the adhesive layer is formed, for example, a heat decomposition accelerator suitable to the base polymer to be used together, such as iron sulfate, sodium nitrite, heavy metal ions, hydroquinone, linolenic acid, ascorbic acid, cysteine, azodicarbonamide, etc. may be blended in accordance with necessity. In addition, a plasticizer such as dibutyl phthalate or dioctyl phthalate, a softener such as xylene oil, terpene oil, paraffin or wax, etc. may be blended in accordance with necessity.

In the adhesive layer 22, as shown in FIG. 2, a plurality of fibers 23 having a softening point at 200° C. or higher are buried in the lengthwise direction of the explosion-proof tape. This aims at prevention of the metal band and the cathode-ray tube from coming in contact with each other, because of interposition of the fibers 23. This is because there is a fear that a high-temperature area might be produced locally due to the temperature unevenness produced in the metal band when the metal band is heated and expanded to be shrink-fitted. Then, the support would be melted by the high temperature so that the metal band would come in contact with the cathode-ray tube so as to damage the glass of the latter. As a result, the cathode-ray tube might explode due to stress concentration caused by the damaged glass. Such a fear of explosion due to contact gets serious particularly in the case of a large-size cathode-ray tube over 30 inches.

The above-mentioned fibers may be composed of desirable fibers having a softening point of 200° C. or higher, for example, polyamide fibers of nylon, aromatic series, or the like; polyester fibers of polyethylene terephthalate or the like; polycyclohexane terephthalate fibers; polyimide fibers; polysulfone fibers; polyether sulfone fibers; polyamide-imide fibers; glass fibers; carbon fibers; etc. Long-size fibers are generally used because they can be arranged in the lengthwise direction of the tape effectively.

Although the diameter of the fibers can be determined desirably in accordance with the strength, the number of arranged fibers, the thickness of the adhesive layer, and so on, fibers each having a diameter of not more than 100 μm, especially in a range of from 10 μm to 80 μm, more especially in a range of from 30 μm to 60 μm are generally used. Although the widthwise intervals of the fibers extending in the lengthwise direction of the tape can be also determined desirably, the intervals are generally set to be in a range of from 0.1 mm to 4 mm, especially in a range of from 0.2 mm to 3 mm, more especially in a range of from 0.5 mm to 2 mm, from the points of the above-mentioned contact prevention effect, the layer strength of the adhesive layer, and so on. In consideration of the width of the explosion-proof tape per se, which is usually set to be in a range of from 10 mm to 100 mm, especially in a range of from 20 mm to 80 mm, more especially in a range of from 30 mm to 70 mm, it is preferable that not less than 5 fibers, especially 10 to 100 fibers, more especially 20 to 50 fibers are disposed in the width of the explosion-proof tape.

The adhesive layer may be applied to the support in a desirable method, for example, a method in which an adhesive composition is developed on the support by a desirable means such as a doctor blade or the like, and then dried; a method in which an adhesive layer provided on a separator in the same manner as the above-mentioned method is transferred onto the support; or the like. Although the thickness of the adhesive layer may be determined desirably, it is generally set to be in a range of from 5 μm to 500 μm, especially in a range of from 30 μm to 200 μm, more especially in a range of from 50 μm to 100 μm.

Figure 3:
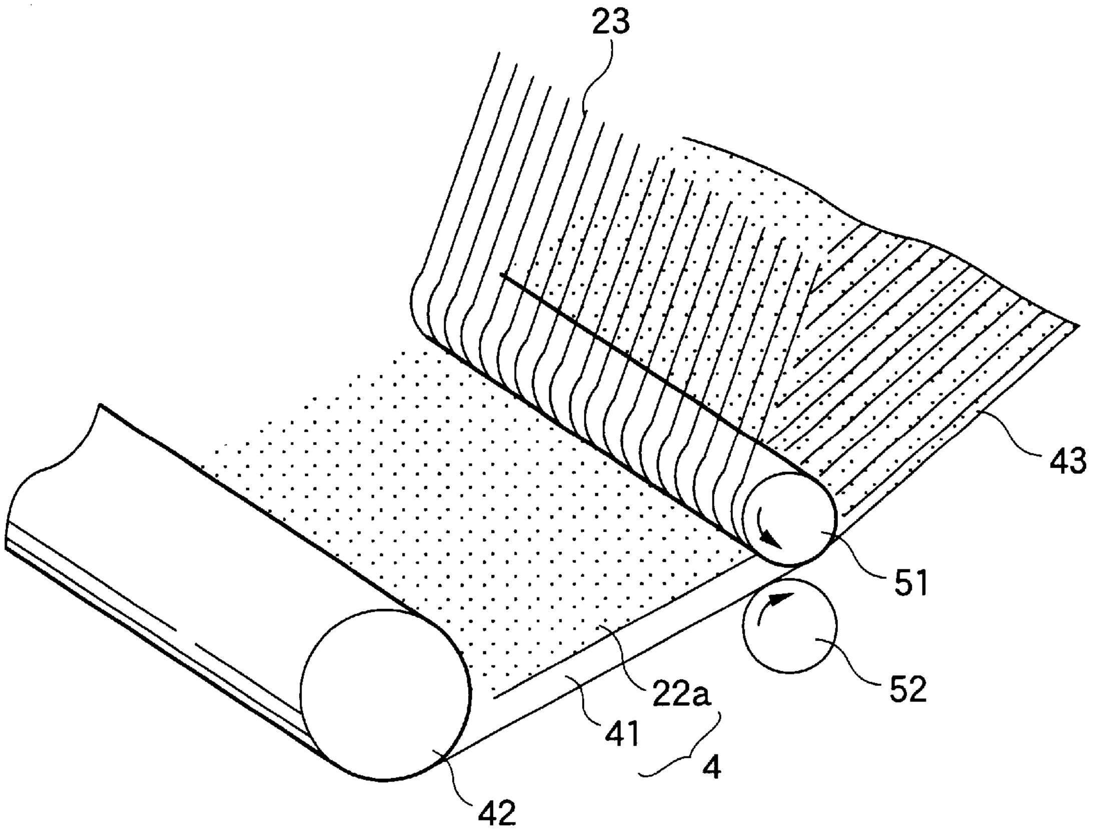
FIG. 3 shows an explanatory view of an embodiment of a process for burying fibers.

The above-mentioned fibers may be buried into the adhesive layer by a desirable method, for example, a sandwich method in which the fibers are disposed between lamination layers when the adhesive layer is laminated by an adhesive agent recoating method, an adhesive layer transfer method, or the like. FIG. 3 shows a specific example of the method.

That is, in the illustrated method, a rolled body 42 of an adhesive sheet 4 in which a thin adhesive layer 22*a,* for example, about 20 μm thick, is provided on the surface side of a support sheet 41 subjected to back-surface treatment with a silicon release agent or the like, is rewound, and in the meanwhile the adhesive layer 22*a* is supplied between rotating pinch rolls 51 and 52 sequentially with a predetermined number of fibers made to train against the adhesive layer 22*a*. The fibers are bonded with and held on the adhesive layer so that a pre-sheet 43 is obtained. After that, in a not-illustrated process, an adhesive layer which is, for example, about 30 to 100 μm. thick, is laid on the adhesive layer which holds the fibers in the pre-sheet. Thus, an explosion-proof sheet is formed. The formed sheet is wound up and cut into a predetermined tape width.

Then, in the above description, there is such a case where the adhesive layer is split and peeled off in the fiber portion due to the buried fibers when the explosion-proof tape is separated, so that adhesive transfer is apt to be produced on the cathode-ray tube. In such a case, it is preferable that the adhesive layer at least on the side to be bonded with the cathode-ray tube, that is, on the side where adhesive transfer is apt to be produced, is formed of an adhesive agent having the above-mentioned low-temperature short-time vanishing property. Therefore, the adhesive layer may be formed as stratified layers composed of different kinds of adhesive.

An explosion-proof structure for a cathode-ray tube according to the present invention can be formed in the same manner as in the background-art except the point that the above-mentioned explosion-proof tape is used. For example, as shown in FIG. 1, the explosion-proof structure can be formed by a method in which the explosion-proof tape 1 is wound on the outer circumference of the panel portion 11 of the cathode-ray tube 1 through the adhesive layer 22 of the explosion-proof tape 1, and the metal band 3 composed of steel or the like is Although the explosion-proof tape which can be separated more easily than the metal band is used according to the present invention, force required for explosion-proof treatment on the cathode-ray tube is equal to the clamping force (f in FIG. 1) through the metal band which can relieve and reduce the bending moment acting on the cathode-ray tube having a vacuum in its inside through the atmosphere as described above. Therefore, the clamping force can be generated satisfactorily only by the metal band. Thus, even if the adhesive force between the metal band and the explosion-proof tape is weak, the clamping force by the metal band can be displayed satisfactorily. As a result, an explosion-proof effect similar to that in the background art can be developed also according to the present invention.

EXAMPLE 1

A 20 μm thick adhesive layer composed of polyisobutylene with weight-average molecular weight of about 1 million was provided on one surface of a 50 μm thick film composed of a mixture of 100 parts (parts by weight, similarly hereinafter) of propylene polymer and 0.5 parts of a slip agent. Then, 30 glass fibers each having a softening point at 220° C. and a diameter of 50 μm were bonded with and held on the adhesive layer at widthwise intervals of 1 mm along the film lengthwise direction by the method shown in FIG. 3. Next, on the adhesive layer, there is provided another 80 μm thick adhesive layer composed of the above-mentioned polyisobutylene so that the total thickness of the adhesive layers reached 100 μm. Thus, an explosion-proof tape was obtained.

Next the above-mentioned explosion-proof tape 50 mm wide was wound on and bonded with the outer circumference of a panel portion of a cathode-ray tube through the adhesive layer of the explosion-proof tape. A steel band 30 mm wide was shrink-fitted thereon by induction heating to 500° C. Thus, an explosion-proof structure (FIG. 1) was formed.

EXAMPLE 2

A toluene solution of an acrylic adhesive agent was applied onto one surface of a 50 μm thick film formed by extending an extrusion-molded film composed of a mixture of 30 parts of propylene homopolymer, 40 parts of ethylene-propylene random copolymer with a propylene content of 70 weight %, and 30 parts of ethylene homopolymer. The toluene-coated film was dried, and an adhesive layer 20 μm thick was provided thereon. Then, in the same manner as in Example 1, 30 nylon-66 fibers each having a softening point at 255° C. and a diameter of 50 μm were bonded with and held on the adhesive layer at widthwise intervals of 1 mm along the film lengthwise direction. Next, on the thus prepared adhesive layer, there is provided another 80 μm thick adhesive layer composed of the above-mentioned acrylic adhesive agent. Thus, an explosion-proof tape was obtained. By use of this explosion-proof tape, an explosion-proof structure was formed. Incidentally, in the acrylic adhesive agent, 60 parts of dibutyl phthalate and 4 parts of melamine crosslinker were blended in 100 parts of base polymer which was formed by polymerization of 95 parts of butyl methacrylate and 5 parts of acrylic acid.

EXAMPLE 3

A 20 μm thick adhesive layer composed of an acrylic adhesive agent in which 40 parts of dibutyl phthalate and 2 parts of isocyanate crosslinker were blended in 100 parts of base polymer which was formed by copolymerization of 93 parts of lauryl methacrylate and 7 parts of acrylic acid, was provided on one surface of a 50 μm thick film composed of a mixture of 70 parts of styrene homopolymer, 30 parts of styrene-isoprene-styrene block copolymer with a styrene content of 10 weight %, and 0.5 parts of a slip agent. Then, in the same manner as in Example 1, 30 polyester fibers each having a softening point at 280° C. and a diameter of 50 μm were bonded with and held on the adhesive layer at widthwise intervals of 1 mm along the film lengthwise direction. Next, on the adhesive layer, there is provided another 80 μm thick adhesive layer composed of the above-mentioned acrylic adhesive agent. Thus, an explosion-proof tape was obtained. By use of this explosion-proof tape, an explosion-proof structure was formed.

Comparative Example 1

A 20 μm thick rubber adhesive layer composed of a composition of 100 parts of masticated rubber, 80 parts of natural rosin resin, 10 parts of phenol resin, and 5 parts of zinc resin was provided on one surface of a 50 μm thick film composed of a mixture of 100 parts of low-density polyethylene and 0.5 parts of a slip agent. Then, in the same manner as in Example 1, 30 polyethylene fibers each having a softening point at 120° C. and a diameter of 50 μm were bonded with and held on the adhesive layer at widthwise intervals of 1 mm along the film lengthwise direction. Next, on the adhesive layer, there is provided another 80 μm thick adhesive layer composed of the above-mentioned polyisobutylene. Thus, an explosion-proof tape was obtained. By use of this explosion-proof tape, an explosion-proof structure was formed.

Comparative Example 2

An explosion-proof tape and an explosion-proof structure were obtained in the same manner as in Example 2, except that instead of nylon fibers, 6 polyethylene fibers each having a softening point at 120° C. and a diameter of 5 μm were bonded with and held at widthwise intervals of 5 mm along the film lengthwise direction.

Comparative Example 3

A 20 μm thick adhesive layer composed of an acrylic adhesive agent in which 40 parts of dibutyl phthalate and 2 parts of isocyanate crosslinker were blended in 100 parts of base polymer formed by copolymerization of 93 parts of acrylic acid 2-ethyl hexyl and 7 parts of acrylic acid, was provided on one surface of a 50 μm thick film composed of a mixture of 40 parts of styrene homopolymer, 60 parts of styrene-isoprene-styrene block copolymer with a styrene content of 10 weight %, and 0.5 parts of a slip agent. Then, in the same manner as in Example 1, 30 polycyclohexane terephthalate fibers each having a softening point at 315° C. and a diameter of 50 μm were bonded with and held on the adhesive layer at widthwise intervals of 1 mm along the film lengthwise direction. Next, on the adhesive layer, there is provided another 80 μm thick adhesive layer composed of the above-mentioned polyisobutylene. Thus, an explosion-proof tape was obtained. By use of this explosion-proof tape, an explosion-proof structure was formed.

Evaluation Test

After steel bands were expanded by electrically conducting heating and removed from respective cathode-ray tubes obtained in Examples and Comparative Examples, the recycling performance based on the manual removability of explosion-proof components remaining on the cathode-ray tubes and the explosion-proof components transferred onto the steel bands, and the existence of damaged portions produced in panel portions of the cathode-ray tubes due to the contact with the steel bands were examined.

The results of the examination are shown in the following table.

| | Example | | | Comparative Example | | |
|---|---|---|---|---|---|---|
| | 1 | 2 | 3 | 1 | 2 | 3 |
| recycling performance | good | good | good | NG | NG | NG |
| existence of damaged portion | no | no | no | yes | yes | no |

In the results, in each of Examples 1 to 3, most of the explosion-proof tape was separated from the cathode-ray tube together with the steel band, and both the separation/removal of the explosion-proof tape from the steel band by finger and the separation/removal of the explosion-proof tape remaining on the cathode-ray tube were easy. In addition, the steel band and the cathode-ray tube were not in contact with each other directly, and the panel portion was not damaged.

On the other hand, in each of Comparative Examples 1 to 3, the support and the adhesive layer of the explosion-proof tape adhered to both the steel band and the cathode-ray tube so firmly that they cannot be separated and removed by finger. In addition, although the steel band and the cathode-ray tube were not in contact with each other directly in Comparative Example 3, the steel band came in contact with the panel portion of the cathode-ray tube directly when it was shrink-fitted in Comparative Examples 2 and 3. Thus, the panel portion was damaged.

Although the invention has been described in its preferred form with a certain degree of particularity, it is understood that the present disclosure of the preferred form can be changed in the details of construction and in the combination and arrangement of parts without departing from the spirit and the scope of the invention as hereinafter claimed.

What is claimed is:

1. An explosion-proof tape wound on an outer circumference of a panel portion of a cathode-ray tube so that a metal band is shrink-fitted on the tape, comprising:

- a support having at least a layer comprising at least one of (i) propylene polymer with a propylene content of not less than 40 weight % and (ii) styrene polymer with a styrene content of not less than 50 weight %; and
- an adhesive layer formed on one surface of said support in a manner so that a plurality of fibers with a softening point of not lower than 200° C. are buried in said adhesive layer in a lengthwise direction of said tape.

2. An explosion-proof tape according to claim 1, wherein said adhesive layer comprises an adhesive agent residue of which will be not more than 5 weight % by heat treatment at 700° C. or lower and for 30 minutes or shorter.

3. An explosion-proof structure for a cathode-ray tube, comprising:

- an explosion-proof tape to be wound on an outer circumference of a panel portion of the cathode-ray tube, said tape comprising:
  - a support having at least a layer comprising at least one of (i) propylene polymer with a propylene content of not less than 40 weight % and (ii) styrene polymer with a styrene content of not less than 50 weight %; and
  - an adhesive layer formed on one surface of said support in a manner so that a plurality of fibers with a softening point of not lower than 200° C. are buried in said adhesive layer in a lengthwise direction of said tape, said adhesive layer being applied on the outer circumference of the panel portion; and
- a metal band being shrink-fitted on another surface of said support of said tape thereby being shrink-fitted on the outer circumference of the panel portion through said tape.

4. An explosion-proof structure for a cathode-ray tube according to claim 3, wherein said adhesive layer comprises an adhesive agent residue of which will be not more than 5 weight % by heat treatment at 700° C. or lower and for 30 minutes or shorter.

* * * * *